United States Patent
Sears et al.

(10) Patent No.: US 11,852,905 B2
(45) Date of Patent: Dec. 26, 2023

(54) PHOTOWETTING OPTICAL ELEMENT

(71) Applicant: Meta Platforms Technologies, LLC, Menlo Park, CA (US)

(72) Inventors: Jasmine Soria Sears, Kirkland, WA (US); Christopher Andrew Galea, Palisades Park, NJ (US); Junren Wang, Redmond, WA (US); Stephen John Holmes, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 215 days.

(21) Appl. No.: 17/130,208

(22) Filed: Dec. 22, 2020

(65) Prior Publication Data
US 2022/0197061 A1    Jun. 23, 2022

(51) Int. Cl.
*G02C 7/10* (2006.01)
*G02B 3/12* (2006.01)
*G02B 26/00* (2006.01)

(52) U.S. Cl.
CPC ............. *G02C 7/10* (2013.01); *G02B 3/12* (2013.01); *G02B 26/004* (2013.01)

(58) Field of Classification Search
CPC ........ G02B 3/12–3/14; G02B 26/004–26/005; G02B 2027/0178; G02F 1/0126
USPC ............ 351/159.68, 44, 159.6; 359/665–666
See application file for complete search history.

(56) References Cited

U.S. PATENT DOCUMENTS

| | | | |
|---|---|---|---|
| 6,113,813 A | 9/2000 | Goudjil | |
| 7,020,355 B2 * | 3/2006 | Lahann | B01D 15/3861 429/492 |
| 7,375,898 B2 * | 5/2008 | Kohno | H04N 5/217 359/666 |
| 7,463,398 B2 * | 12/2008 | Feenstra | G02B 26/005 345/32 |
| 7,646,525 B2 * | 1/2010 | Cheng | G02B 26/005 359/247 |
| 8,174,772 B1 * | 5/2012 | DeVaul | G02B 26/005 136/243 |
| 8,693,081 B2 * | 4/2014 | Heikenfeld | G02B 26/005 359/254 |
| 8,754,844 B2 * | 6/2014 | Bae | G02B 26/004 359/666 |
| 8,797,630 B2 * | 8/2014 | Chen | G02B 26/005 359/290 |
| 8,842,360 B2 * | 9/2014 | Shim | G09G 3/348 345/55 |

(Continued)

OTHER PUBLICATIONS

Pei Yu Chiou, Hyejin Moon, Hiroshi Toshiyoshi, Chang-Jin Kim, Ming C. Wu, Light actuation of liquid by optoelectrowetting, Sensors and Actuators A: Physical, vol. 104, Issue 3, 2003, pp. 222-228. (Year: 2003).*

(Continued)

*Primary Examiner* — Zachary W Wilkes
(74) *Attorney, Agent, or Firm* — FREESTONE INTELLECTUAL PROPERTY LAW PLLC; Aaron J. Visbeek (57) ABSTRACT

An optical element includes a first layer, a second layer, and a fluid. A first surface of the first layer is configured to change hydrophobicity in response to incoming activation light. Absorbing molecules in the fluid are repelled or attracted to the first surface in response to the hydrophobicity of the first surface.

19 Claims, 7 Drawing Sheets

(56) References Cited

U.S. PATENT DOCUMENTS

| | | | | | |
|---|---|---|---|---|---|
| 8,947,761 | B2* | 2/2015 | Takahashi | ............ | G02B 26/005 359/290 |
| 8,976,436 | B2* | 3/2015 | Dean | .................... | G02B 26/005 359/290 |
| 9,046,681 | B2* | 6/2015 | Kuo | ....................... | G02B 26/005 |
| 9,784,965 | B2* | 10/2017 | Araki | ..................... | G09G 3/348 |
| 9,989,752 | B2* | 6/2018 | Jung | .................... | G02B 26/004 |
| 10,018,828 | B2* | 7/2018 | Massard | ................ | G09G 3/348 |
| 10,613,315 | B2* | 4/2020 | Zhu | ........................ | G09G 3/2074 |
| 11,135,588 | B2* | 10/2021 | Isaac | ................ | B01L 3/502792 |
| 2003/0142901 | A1* | 7/2003 | Lahann | .................. | B82Y 10/00 385/18 |
| 2005/0104804 | A1* | 5/2005 | Feenstra | ................. | G09F 9/372 345/41 |
| 2007/0236802 | A1* | 10/2007 | Kohno | ................... | H04N 5/217 359/665 |
| 2008/0130087 | A1* | 6/2008 | Miyata | ................. | G02B 26/004 359/267 |
| 2008/0150867 | A1* | 6/2008 | Miyata | ................. | G02B 26/004 345/93 |
| 2008/0218444 | A1* | 9/2008 | Rosser | ................. | G02B 26/005 345/60 |
| 2009/0185255 | A1* | 7/2009 | Cheng | .................. | G02B 26/005 359/228 |
| 2011/0084944 | A1* | 4/2011 | Bae | ...................... | G02B 26/004 345/205 |
| 2012/0024708 | A1* | 2/2012 | Chiou | ............... | B01L 3/502792 204/643 |
| 2012/0212792 | A1* | 8/2012 | Brown Elliott | ........ | G02B 5/201 445/24 |
| 2013/0128336 | A1* | 5/2013 | Dean | ...................... | G02B 26/02 359/290 |
| 2014/0168747 | A1* | 6/2014 | Kuo | ..................... | G02B 26/005 359/290 |
| 2014/0340286 | A1* | 11/2014 | Machida | .............. | G02B 27/017 345/8 |
| 2021/0149184 | A1* | 5/2021 | Zhitomirsky | ........ | G02B 26/005 |

OTHER PUBLICATIONS

Yang D, Piech M, Bell NS, Gust D, Vail S, Garcia AA, Schneider J, Park CD, Hayes MA, Picraux ST. Photon control of liquid motion on reversibly photoresponsive surfaces. Langmuir. Oct. 9, 2007;23(21):10864-72. doi: 10.1021/la701507r. Epub Sep. 6, 2007. PMID: 17803327. (Year: 2007).*

P.-Y. Chiou, Z. Chang and M. C. Wu, "Droplet Manipulation With Light on Optoelectrowetting Device," in Journal of Microelectromechanical Systems, vol. 17, No. 1, pp. 133-138, Feb. 2008, doi: 10.1109/JMEMS.2007.904336. (Year: 2008).*

P. Y. Chiou, Sung-Yong Park, and Ming C. Wu, "Continuous optoelectrowetting for picoliter droplet manipulation", Appl. Phys. Lett. 93, 221110 (2008) (Year: 2008).*

Goubert G, Galstian T. Observation of a photo wetting effect on anisotropic liquid-solid interfaces. Opt Express. Jun. 8, 2009;17(12): 9637-47. doi: 10.1364/oe.17.009637. PMID: 19506613. (Year: 2009).*

Valley, Justin K., et al. "A Unified Platform for Optoelectrowetting and Optoelectronic Tweezers." Lab on a Chip, vol. 11, No. 7, 2011, pp. 1292-1297., https://doi.org/10.1039/c0lc00568a. (Year: 2011).*

Nicoletta FP, Cupelli D, Formoso P, De Filpo G, Colella V, Gugliuzza A. Light responsive polymer membranes: a review. Membranes (Basel). Mar. 2, 2012;2(1):134-97. doi: 10.3390/membranes2010134. PMID: 24957966; PMCID: PMC4021883. (Year: 2012).*

Xu, Z., Ao, Z., Chu, D. et al. Reversible Hydrophobic to Hydrophilic Transition in Graphene via Water Splitting Induced by UV Irradiation. Sci Rep 4, 6450 (2014). https://doi.org/10.1038/srep06450 (Year: 2014).*

Si Kuan Thio, Sung Woo Bae, Sung-Yong Park, Lab on a smartphone (LOS): A smartphone-integrated, plasmonic-enhanced optoelectrowetting (OEW) platform for on-chip water quality monitoring through LAMP assays, Sensors and Actuators B: Chemical, vol. 358, 2022, 131543, (Year: 2022).*

Ichimura K., et al., "Light-Driven Motion of Liquids on a Photoresponsive Surface," Science, vol. 288, No. 5471, Jun. 2, 2000, pp. 1624-1626.

International Search Report and Written Opinion for International Application No. PCT/US2021/064644 dated Apr. 11, 2022, 9 pages.

Areephong Jetsuda, Dithienylethene Optical Switches, Multicomponent Molecular Systems, Ph. D. thesis, University of Groningen, The Netherlands, 2009, 219, 219 p. ISB: 978-90-367-3820-0 (electronic version).

* cited by examiner

FIG. 7

PHOTOWETTING OPTICAL ELEMENT

TECHNICAL FIELD

This disclosure relates generally to optics and in particular to photowetting optical elements.

BACKGROUND INFORMATION

Changing environments often corresponds with a change in intensity of ambient light in the environment. For example, ambient light intensity changes from indoor to outdoor settings. Photochromic lenses are commonly used in both prescription glasses and non-prescription sunglasses. In some photochromic lenses, photochromic molecules included in the lenses reduce transmission of incident light through the lens (darkening) in response to light, for example. Yet, conventional photochromic solutions can be slower than desirable. And, active dimming solutions that require electronics in lenses add cost, complexity, and often diminish optical properties of the optical elements.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of photowetting optical elements are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some embodiments of the disclosure, "near-eye" may be defined as including an optical element that is configured to be placed within 35 mm of an eye of a user while a near-eye optical device such as a head mounted device or head mounted display (HMD) is being utilized. Photowetting optical elements described in this disclosure may be used as near-eye optical elements.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm. In aspects of this disclosure, ultraviolet light may be defined as having a wavelength range of approximately 100 nm-400 nm.

In aspects of this disclosure, the term "transparent" may be defined as having greater than 90% transmission of light. In some aspects, the term "transparent" may be defined as a material having greater than 90% transmission of visible light.

Embodiments of this disclosure may improve dimming of optical elements (e.g. lenses) by utilizing photoactive molecules that change hydrophobicity in response to incoming activation light (e.g. ultraviolet light). The features and techniques described in this disclosure may be used in prescription glasses, non-prescription sunglasses, and/or head mounted displays, for example. Conventional photochromic technologies are relatively slow to transition between dimming states, especially when the environment changes from an outdoor setting (with sunlight) to an indoor setting. Active dimming solutions increase costs and complexity in addition to requiring electrical power. Additionally, transparent conductors such as indium tin oxide (ITO) deployed in active dimming solutions across an optical element negatively affect the see-through light of an optical element that includes one or more transparent conductor layers across the optical element.

In implementations of the disclosure, at least one surface of an optical element changes hydrophobicity in response to incoming activation light (e.g. ultraviolet light) and absorbing molecules included in a fluid change positions in response to the changing hydrophobicity of the surface. In an illustrative example, the fluid includes a polar solution that includes absorbing molecules and a nonpolar fluid that is transparent. Just like a fluid of oil (nonpolar) and water (polar) tend to stay apart from each other, the polar solution that includes the absorbing molecules will tend to stay apart from the nonpolar transparent fluid. Additionally, the polar solution (including the absorbing molecules) will concentrate to surfaces that are hydrophilic. Consequently, the shape or position of the absorbing molecules (in the polar solution) changes in response to the hydrophobicity of a surface that interacts with the fluid. Hence, strategic design of a surface that changes hydrophobicity in response to incoming activation light can advantageously change the shape or position of the absorbing molecules to absorb more light or less light propagating through the optical element.

In a particular implementation, an optical element includes a first layer and a second layer that confine a fluid that includes light absorbing molecules. One or both of the first layer and the second layer include photoactive molecules (e.g. photochromic azobenzene) that change hydrophobicity in response to incident incoming activation light (e.g. ultraviolet light). The fluid changes shape or position when the hydrophobicity of the surface changes and the light absorbing molecules are therefore rearranged to positions that increase or decrease the intensity of light that propagates through the optical element. These and other embodiments are described in more detail in connection with FIGS. 1-7.

Figure 1:
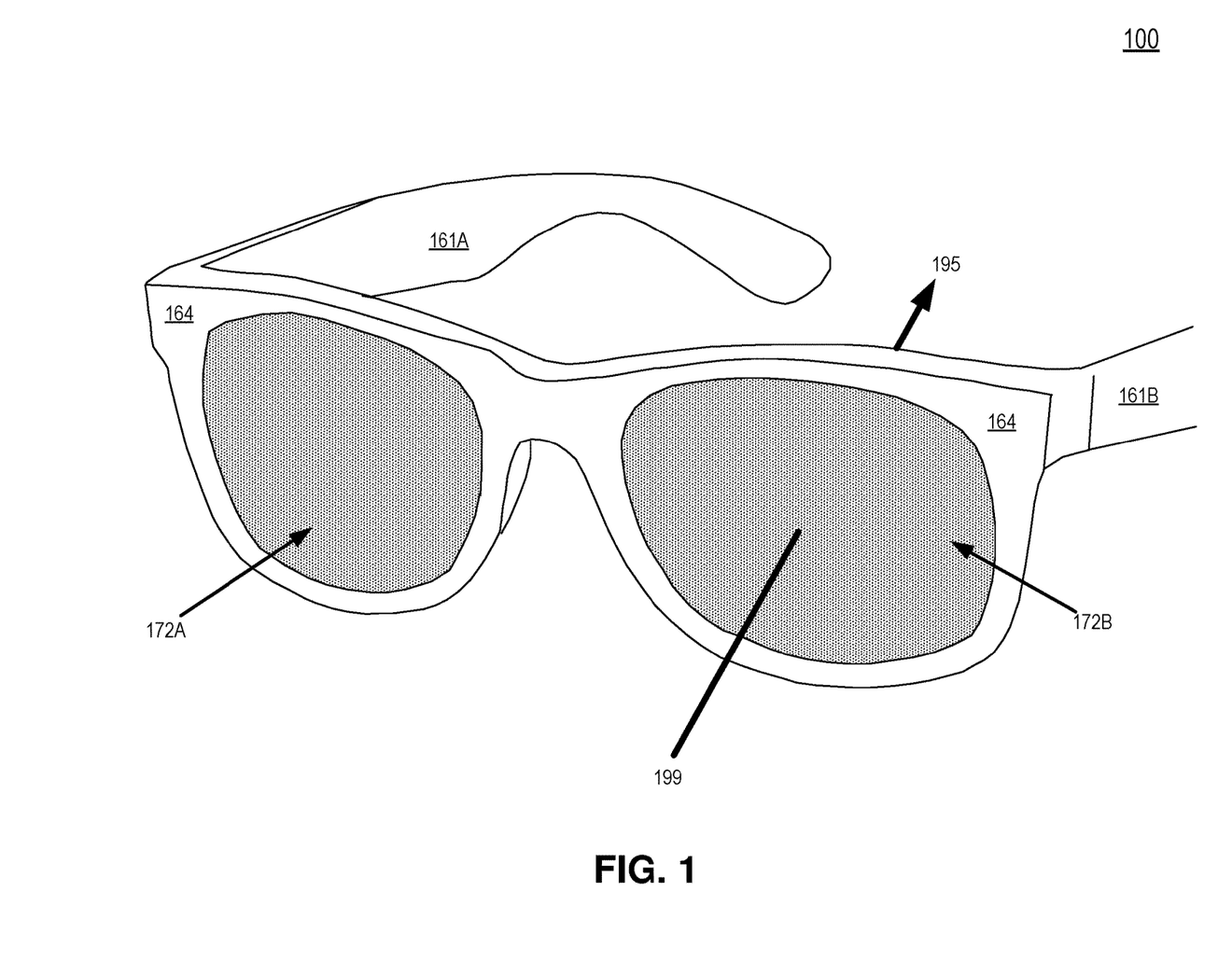
FIG. 1 illustrates glasses that include photowetting optical elements, in accordance with aspects of the disclosure.

FIG. 1 illustrates glasses 100 that include photowetting optical elements 172A and 172B, in accordance with aspects of the disclosure. Glasses 100 include arms 161A and 161B coupled to a frame 164. Photowetting optical elements 172A and 172B are included in frame 164. Optical elements 172A and 172B are described as "photowetting" since a change in hydrophobicity of a surface of the optical element influences the transmission of incident light 199 that propagates through a photowetting optical element 172A or 172B. If a photowetting optical element 172 is in a maximum absorption state, the remaining light 195 (the portion of incident light 199 that is not absorbed by absorbing molecules in the photowetting optical element) will be significantly reduced. If a photowetting optical element 172 is in a minimum absorption state, the remaining light 195 may have almost the same intensity as incident light 199.

Figure 2A:
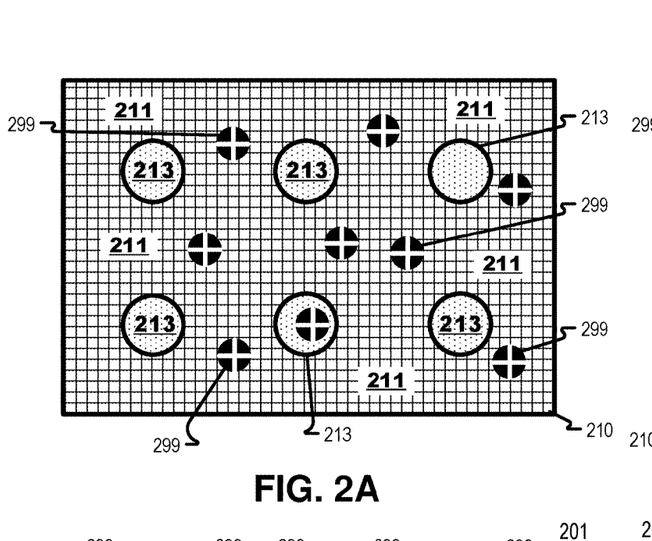
FIGS. 2A-2D illustrate different views of an example photowetting optical element, in accordance with aspects of the disclosure.
Figure 2B:
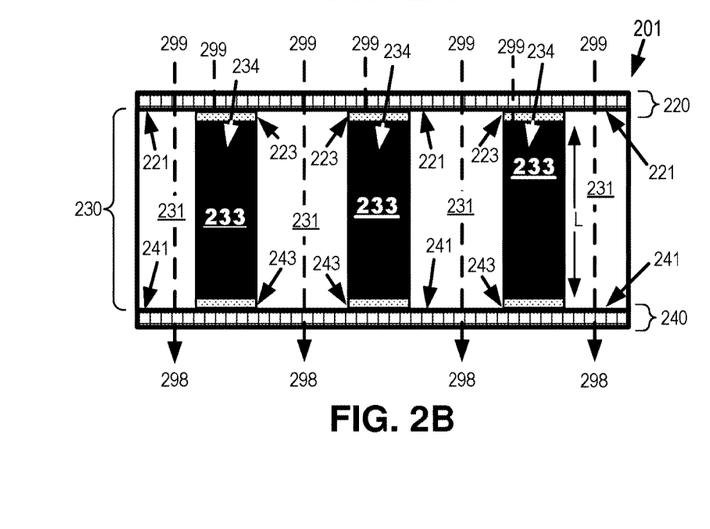
Figure 2C:
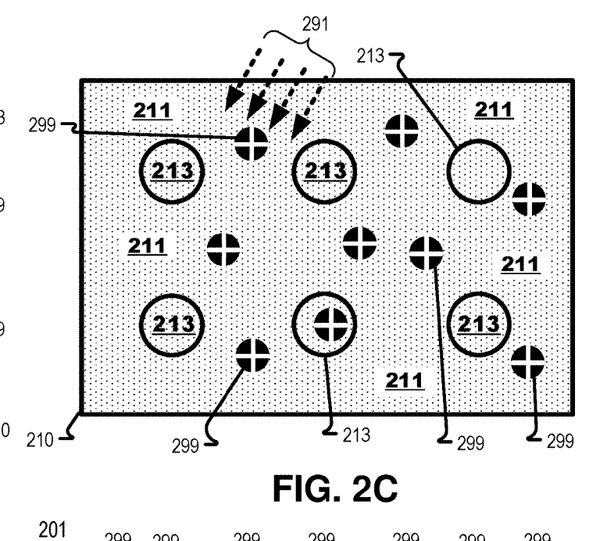
Figure 2D:
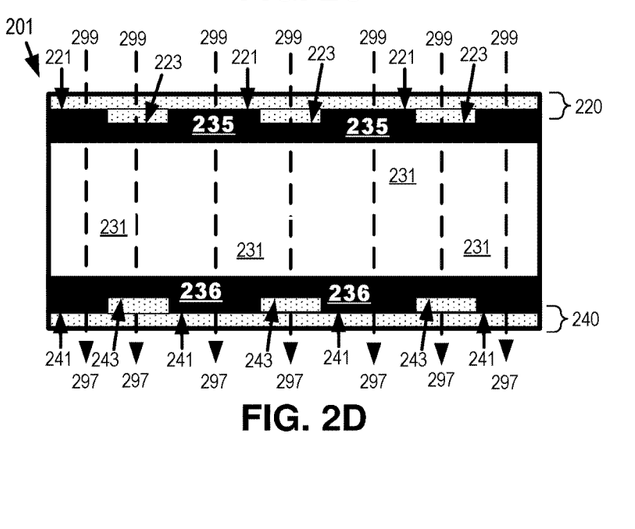

FIGS. 2A-2D illustrate different views of an example photowetting optical element 201, in accordance with aspects of the disclosure. FIG. 2A illustrates a front view of layer 210 that may be used as first layer 220 in photowetting optical element 201 of FIG. 2B. FIG. 2B illustrates a zoomed in top view of photowetting optical element 201. FIGS. 2A and 2B illustrate a minimum absorption state of photowetting optical element 201 while FIGS. 2C and 2D illustrate a maximum absorption state of photowetting optical element 201 when incoming activation light 291 is incident on photowetting optical element 201. Incoming activation light 291 is within an activation wavelength band of surface 211. In implementations where the activation wavelength band of surface 211 is in the ultraviolet light range, incoming activation light 291 is ultraviolet light.

FIG. 2A illustrates a front view of a layer 210 that may be used as first layer 220 and second layer 240 of optical element 201. Layer 210 includes a first surface 211 configured to change hydrophobicity in response to incoming activation light incident onto the first surface 211. For the purposes of this disclosure, a change in hydrophobicity includes a surface changing from a hydrophobic surface to a hydrophilic surface or a surface changing from a hydrophilic surface to a hydrophobic surface. The surfaces that change hydrophobicity in this disclosure may include photoactive molecules that change hydrophobicity in response to incident incoming activation light (e.g. ultraviolet light). The photoactive molecules may be photochromic azo compounds bearing the function group diazinyl R—N=N—R', in which R and R' can be either aryl or alkyl. An example azo compound for using as photoactive molecules on surfaces and/or solutions of the disclosure is photochromic azobenzene. A hydrophobic surface has a water contact angle of between 90 degrees and 180 degrees and a hydrophilic surface has a water contact angle between zero degrees and 90 degrees. The water contact angle is the angle of the leading edge of a water droplet on the surface. A water contact angle of 180 degrees would represent a water droplet sitting on a (hydrophobic) surface as a perfect sphere whereas a water contact angle of zero degrees would represent a water droplet that had spread evenly across the (hydrophilic) surface.

In some implementations of the disclosure, a surface changing hydrophobicity may include the surface changing from a superhydrophobic to a superhydrophilic surface or a surface changing from a superhydrophilic surface to a superhydrophobic surface. A superhydrophilic surface may be defined as a surface having a water contact angle that is ten degrees or less. A superhydrophobic surface (also referred to as ultrahydrophobic surface) may be defined as a surface having a water contact angle that is exceeds 150 degrees.

In the example implementation of FIG. 2A, the checkered fill of surface 211 indicates a hydrophobic surface 211 and the sparse dots of surfaces 213 indicate a hydrophilic surface 213. Of course, those skilled in the art appreciate that, in other implementations, surface 211 could be a hydrophilic surface 211 in FIGS. 2A and 2B that changes to a hydrophobic surface in FIGS. 2C and 2D in response to incoming activation light 291 becoming incident onto surface 211. In this other implementation, surface 213 would be a hydrophobic surface in the absence of incoming activation light 291.

Layer 210 includes surface 211 and surface 213 and may be used as layers 220 and 240 in the optical element 201 of FIG. 2B. In FIG. 2B, layer 220 includes surface 221 and surface 223 that may have the features of surface 211 and surface 213, respectively. Similarly, layer 240 includes surface 241 and surface 243 that may have the features of surface 211 and surface 213, respectively. Surfaces 223 and 243 may be slightly raised above surfaces 221 and 241, respectively, as illustrated in FIG. 2B. In some implementations, surfaces 223 and 243 may be slightly sunk below surfaces 221 and 241, respectively. Surface 223 may have a thickness that is only one or two molecules in thickness and so surface 221 and surface 223 may be approximately flush, in some implementations. Similarly, surface 243 may have a thickness that is only one or two molecules in thickness and so surface 241 and surface 243 may be approximately flush, in some implementations FIG. 2B illustrates that a fluid 230 is disposed between first layer 220 and second layer 240. Fluid 230 is configured to change shape or position in response to surface 221 and/or surface 241 changing hydrophobicity. Example fluid 230 includes an absorbing solution 233 that is immiscible to a surrounding fluid 231. In one implementation, fluid 230 includes a polar absorbing solution 233 and a nonpolar surrounding fluid 231 that is immiscible to the polar absorbing solution 233. Absorbing solution 233 includes absorbing molecules configured to absorb light. The absorbing molecules may be specifically configured to absorb a very high percentage (e.g. 90% or greater) of visible light. Surrounding fluid 231 is transparent to visible light. A transparent diffusion pump oil having high viscosity pentaphenyl-trimethyl-trisiloxane silicone fluid may be used as surrounding fluid 231, in some implementations.

In the illustration of FIG. 2B, fluid 230 is confined by layer 220 and layer 240 and the absorbing molecules in absorbing solution 233 are concentrated into absorbing pillars 234 between surfaces 223 and surfaces 243, where surfaces 223 function as first pillar surfaces of layer 220 and surfaces 243 function as second pillar surfaces in the absence of incoming activation light 291. Without incoming activation light (e.g. ultraviolet light) incident on surfaces 221 and 241, the polar absorbing solution 233 that includes the absorbing molecules concentrates to the hydrophilic surfaces 223 and 243. A length L of the absorbing pillars 234 runs substantially normal to the layer 220 and layer 240, in FIG. 2B.

Returning to the front view of FIG. 2A, light 299 that would propagate through an optical element 201 (that included layers 220 and 240 that are similar to example layer 210) would largely propagate through optical element 201 since surfaces 213 of layer 210 occupy a low percentage (e.g. 1%-15%) of the area of layer 210. In FIG. 2A, nine example rays of light 299 are illustrated as propagating into the drawing page and only one of the example rays of light 299 encounters surface 213. Therefore, optical element 201 is illustrated in a minimum absorption state in FIGS. 2A and 2B since a majority of the incident light 299 propagates through transparent surrounding fluid 231 of optical element 201 while the absorbing molecules of the absorbing solution are aligned into absorbing pillars 234 between surfaces 223 and 243. In FIG. 2B, remaining light 298 (the portion of incident light 299 that is not absorbed by absorbing molecules in absorbing solution 233) may have more 90% or more the intensity of incident light 299. In other words, optical element 201 may have 90% or more transparency to visible light in its minimum absorption state. In an implementation, a majority of visible light in incident light 299 is allowed to propagate through optical element 201 in the absence of incoming activation light 291.

Optical element 201 may be in a minimum absorption state when optical element 201 is in an indoor environment where the intensity of any incoming activation light 291 is not sufficient to change the hydrophobicity of surface 221 and/or surface 241. In an example where surfaces 221 and 243 are configured to change hydrophobicity in response to incident ultraviolet light, the intensity of ultraviolet light from light bulbs (or even daylight from windows that block a high percentage of ultraviolet light) may not be sufficient to change the hydrophobicity of surfaces 221 and 243. In contrast, when optical element is in an outdoor environment, ultraviolet light from sunlight may have an intensity sufficient to change the hydrophobicity of surfaces 221 and 243 and reconfigure optical element 201 into a maximum absorption state illustrated in FIGS. 2C and 2D.

FIG. 2C illustrates a front view of layer 210 where surface 211 has changed hydrophobicity in response to incoming activation light 291. In the particular illustrated implementation of FIGS. 2C and 2D, the sparse dot pattern on surface 211 indicates that surface 211 has changed from hydrophobic (in FIGS. 2A and 2B) to hydrophilic.

The top view of optical element 201 in FIG. 2D illustrates surface 221 and surface 241 have changed hydrophobicity in response to incoming activation light 291 becoming incident on surface 221 and 241. As a result, surfaces 221 and 241 have changed to hydrophilic surfaces and absorbing molecules in the absorbing solution form absorption layers 235 and 236 that are substantially parallel to layer 220 and 240 when incoming activation light 291 is incident on surface 221 and 241. FIGS. 2C and 2D illustrate the maximum absorption state of optical element 201 where the remaining light 297 (the portion of incident light 299 that is not absorbed by absorbing molecules in absorption layers 235 and 236) is less than 50% of the intensity of incident light 299. In some implementations, remaining light 297 may be less than 10% of the intensity of incident light 299. Absorption layers 235 and 236 may extend as two-dimensional absorption layers that approach the full two-dimensional area of optical element layers 220 and 240.

Figure 3A:
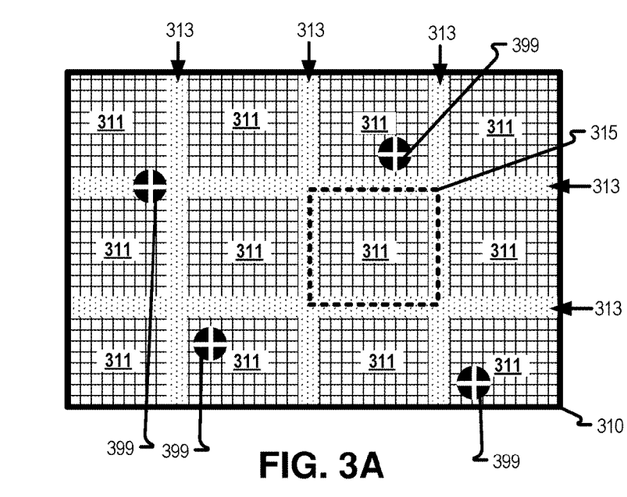
FIGS. 3A-3D illustrate different views of an example photowetting optical element that includes cells confining a fluid, in accordance with aspects of the disclosure.
Figure 3B:
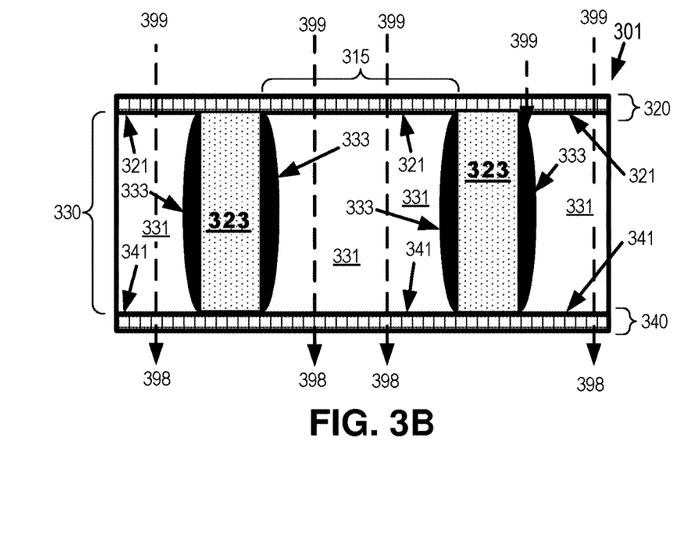
Figure 3C:
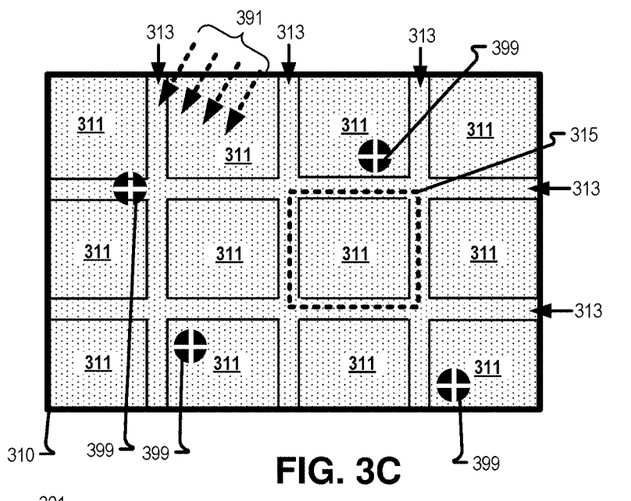
Figure 3D:
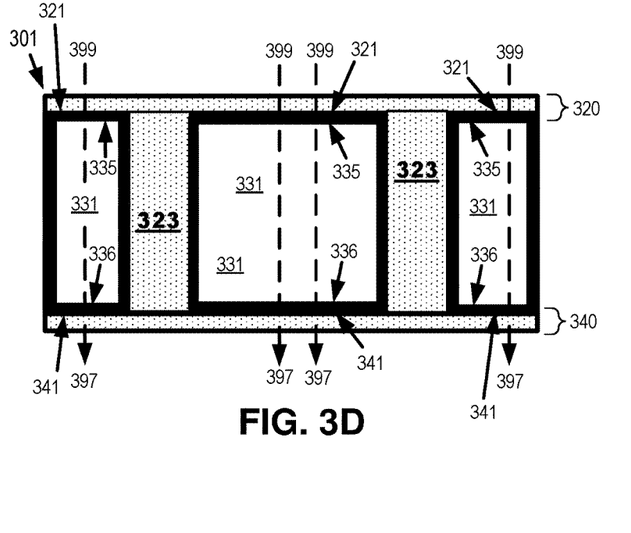

FIGS. 3A-3D illustrate different views of an example photowetting optical element 301 that includes cells 315 confining fluid 330, in accordance with aspects of the disclosure. FIG. 3A illustrates a front view of layer 310 that may be used as first layer 320 in photowetting optical element 301 of FIG. 3B. FIG. 3B illustrates a zoomed in top view of photowetting optical element 301. FIGS. 3A and 3B illustrate a minimum absorption state of photowetting optical element 301 while FIGS. 3C and 3D illustrate a maximum absorption state of photowetting optical element 301 when incoming activation light 391 is incident on photowetting optical element 301. Incoming activation light 391 is within an activation wavelength band of surface 311. In implementations where the activation wavelength band of surface 311 is in the ultraviolet light range, incoming activation light 391 is ultraviolet light.

FIG. 3A illustrates a front view of a layer 310 that may be used as first layer 320 and second layer 340 of optical element 301 illustrated in FIG. 3B. Layer 310 of FIG. 3A includes surface 311 configured to change hydrophobicity in response to incoming activation light 391 becoming incident on surface 311. In the example implementation of FIG. 3A, the checkered fill of surface 311 indicates a hydrophobic surface 311 and the sparse dots of cell boundary surfaces 313 indicate a hydrophilic surface 313. Cell boundaries 313 confine fluid 330 into a plurality of cells 315 disposed between the layer 320 and 340. Of course, those skilled in the art appreciate that, in other implementations, surface 311 could be a hydrophilic surface 311 in FIGS. 3A and 3B that changes to a hydrophobic surface in FIGS. 3C and 3D in response to incoming activation light 391 becoming incident onto surface 311. In this other implementation, cell boundary surfaces 313 would be a hydrophobic surface. The cell boundary surface 313 may form cells that are dimensioned approximately 2 mm by 2 mm. Although cell boundary surface(s) 313 indicate a rectangle cell shape, cells of other shapes are also possible. For example, the cells may be oval, triangular, or other suitable shape.

Layer 310 that includes surface 311 and cell boundary surface 313 may be used as layers 320 and 340 in the optical element 301 of FIG. 3B. In FIG. 3B, layer 320 includes surface 321 that may have the features of surface 311. Similarly, layer 340 includes surface 341 that may have the features of surface 311. Cell boundary surfaces 323 are disposed between layer 320 and 340 to form a plurality of cells in optical element 301 that confine fluid 330. Fluid 330 may have similar features as described with respect to fluid 230. Fluid 330 includes absorbing solution 333 including absorbing molecules and a transparent surrounding fluid 331. The cell design aspects of optical element 301 may assist in ensuring a more even distribution of the absorbing solution 333 and transparent fluid 331 throughout the optical element 301.

FIG. 3B illustrates that a fluid 330 is disposed between first layer 320 and second layer 340. Fluid 330 is configured to change shape or position in response to surface 321 and/or surface 341 changing hydrophobicity. Example fluid 330 includes an absorbing solution 333 that is immiscible to a surrounding fluid 331. In one implementation, fluid 330 includes a polar absorbing solution 333 and a nonpolar surrounding fluid 331 that is, of course, immiscible to the polar absorbing solution 333. Absorbing solution 333 includes absorbing molecules configured to absorb light. The absorbing molecules may be specifically configured to absorb a very high percentage (e.g. 90% or greater) of visible light. Surrounding fluid 331 is transparent to visible light.

In the illustration of FIG. 3B, fluid 330 is confined into cells 315 by cell boundaries 323. Within cell 315, the absorbing molecules in absorbing solution 333 are concentrated along cell boundaries 323 since cell boundaries 323 are hydrophilic and surfaces 321 and 341 are hydrophobic in the absence of incoming activation light 391 incident on surfaces 321 and 341. Since surfaces 321 and 341 are configured to repel the absorbing molecules in absorbing solution 333, the concentration of the absorbing solution 333 along the cell boundaries puts optical element 301 in its minimum absorption state and a majority of the incident light 399 propagates through transparent surrounding fluid 331 of optical element 301.

Returning to the front view of FIG. 3A, light 399 that would propagate through an optical element 301 (that included layers 320 and 340 that are similar to example layer 310) would largely propagate through optical element 301 since cell boundary surfaces 313 of layer 310 occupy a low percentage (e.g. 1%-15%) of the area of layer 310. In FIG. 3B, remaining light 398 (the portion of incident light 399 that is not absorbed by absorbing molecules in absorbing solution 333) may have 90% or more the intensity of incident light 399. In other words, optical element 301 may have 90% or more transparency to visible light in its minimum absorption state. In an implementation, a majority of visible light in incident light 399 is allowed to propagate through optical element 301 in the absence of incoming activation light 391.

FIG. 3C illustrates a front view of layer 310 where surface 311 has changed hydrophobicity in response to incoming activation light 391. In the particular illustrated implementation of FIGS. 3C and 3D, the sparse dot pattern on surface 311 indicates that surface 311 has changed from hydrophobic (in FIGS. 3A and 3B) to hydrophilic.

The top view of optical element 301 in FIG. 3D illustrates surface 321 and surface 341 have changed hydrophobicity in response to incoming activation light 391 becoming incident on surface 321 and 341. As a result, surfaces 321 and 341 have changed to hydrophilic surfaces and absorbing molecules in the absorbing solution 333 form absorption layers 335 and 336 that are substantially parallel to layer 320 and 340 when incoming activation light 391 is incident on surface 321 and 341. Since cell boundaries 323 are still hydrophilic, a portion of the absorbing molecules in the absorbing solution 333 may still be disposed along cell boundaries 323 in the illustrated maximum absorption state of optical element 301. FIGS. 3C and 3D illustrate the maximum absorption state of optical element 301 where the remaining light 397 (the portion of incident light 399 that is not absorbed by absorbing molecules in absorption layers 335 and 336) is less than 50% of the intensity of incident light 399. In some implementations remaining light 397 may be less than 10% of the intensity of incident light 399. Absorption layers 335 and 336 may extend as two-dimensional absorption layers that approach the full two-dimensional area of each cell 315 of optical element 301. In some implementations, cell boundaries 313 are darkened to avoid light leakage in the maximum absorption state so that incident light 399 is unable to propagate through cell boundaries 313/323.

Figure 4A:
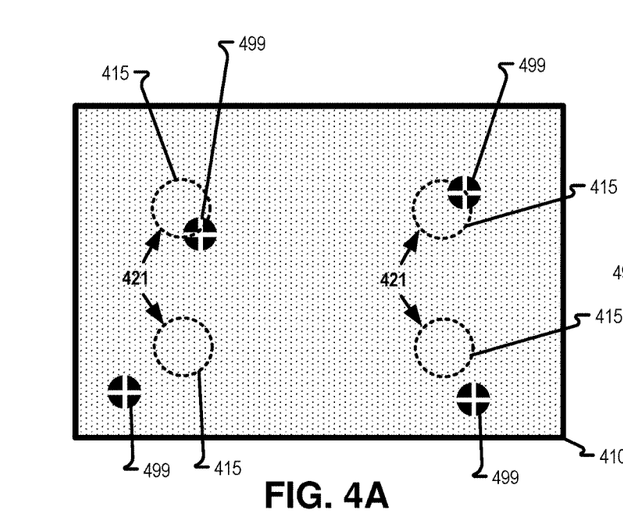
FIG. 4A-4D illustrate different views of an example photowetting optical element that includes reservoirs, in accordance with aspects of the disclosure.
Figure 4B:
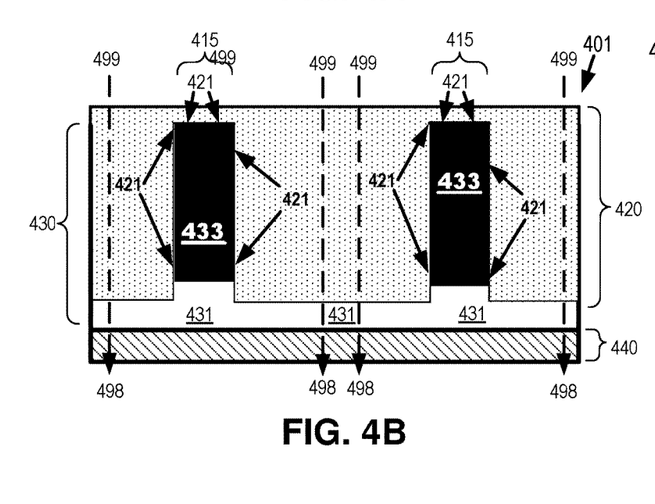
Figure 4C:
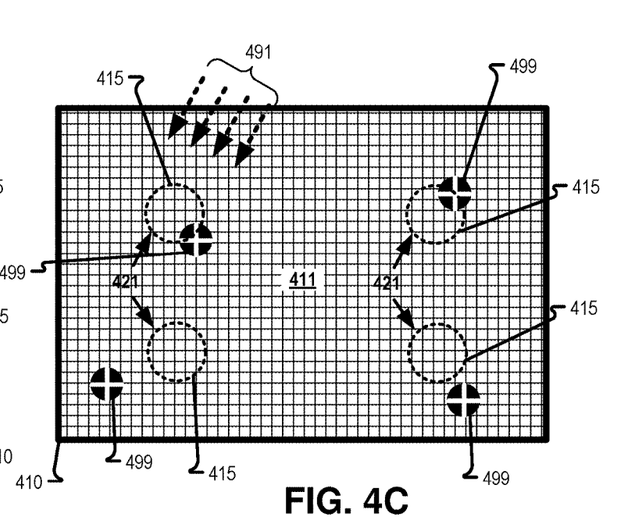
Figure 4D:
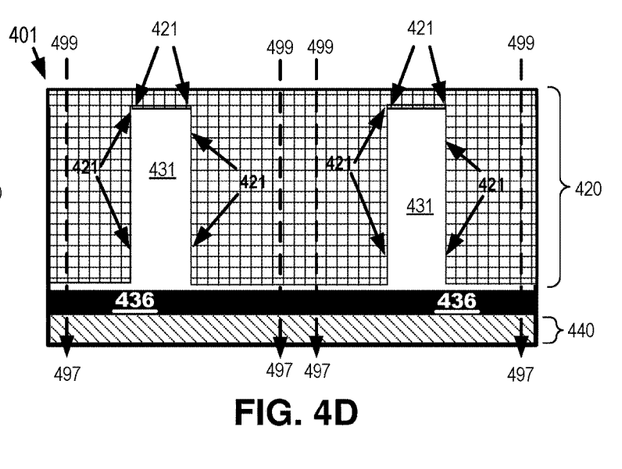

FIGS. 4A-4D illustrate different views of an example photowetting optical element 401 that includes reservoirs 415, in accordance with aspects of the disclosure. FIG. 4A illustrates a front view of layer 410 that may be used as first layer 420 in photowetting optical element 401 of FIG. 4B. FIG. 4B illustrates a zoomed in top view of photowetting optical element 401. FIGS. 4A and 4B illustrate a minimum absorption state of photowetting optical element 401 while FIGS. 4C and 4D illustrate a maximum absorption state of photowetting optical element 401 when incoming activation light 491 is incident on photowetting optical element 401. Incoming activation light 491 is within an activation wavelength band of reservoir surfaces 421. In implementations where the activation wavelength band of reservoir surfaces 421 is in the ultraviolet light range, incoming activation light 491 is ultraviolet light.

FIG. 4A illustrates a front view of a layer 410 that may be used as first layer 420 of optical element 401 illustrated in FIG. 4B. Layer 410 includes reservoir surfaces 421 of reservoirs 415 configured to change hydrophobicity in response to incoming activation light 491 incident onto the reservoir surfaces 421. Although the dashed-circles of FIG. 4A indicate a cylindrical reservoir cavity, reservoirs of other shapes are also possible. For example, reservoirs 415 may take on an oval cross-section, a rectangle cross-section, or a free-form cross-section that is extruded out to form a reservoir for holding absorbing solution 433.

Layer 410 of FIG. 4A includes reservoir surfaces 421 configured to change hydrophobicity in response to incoming activation light 491 becoming incident on reservoir surfaces 421. In the example implementation of FIG. 4A, the sparse dots of layer 410 indicates hydrophilic reservoir surfaces 421. Of course, those skilled in the art appreciate that, in other implementations, reservoir surfaces 421 could be hydrophobic reservoir surfaces 421 in FIGS. 4A and 4B that changes to hydrophilic reservoir surfaces in FIGS. 4C and 4D in response to incoming activation light 491 becoming incident onto reservoir surfaces 421.

Layer 410 that includes reservoir surfaces 421 may be used as layer 420 in the optical element 401 of FIG. 4B. Reservoir surfaces 421 define reservoirs 415. Fluid 430 is disposed between layer 420 and layer 440. For optical element 401, layer 440 does not change hydrophobicity. Layer 420 and layer 440 may confine fluid 430. Fluid 430 may have similar features as described with respect to fluid 230. Fluid 430 includes absorbing solution 433 including absorbing molecules and a transparent surrounding fluid 431.

Fluid 430 is configured to change shape or position in response to reservoir surfaces 421 changing hydrophobicity. Example fluid 430 includes an absorbing solution 433 that is immiscible to a surrounding fluid 431. In one implementation, fluid 430 includes a polar absorbing solution 433 and a nonpolar surrounding fluid 431 that is immiscible to the polar absorbing solution 433. Absorbing solution 433 includes absorbing molecules configured to absorb light. The absorbing molecules may be specifically configured to absorb a very high percentage (e.g. 90% or greater) of visible light. Surrounding fluid 431 is transparent to visible light.

In the illustrated implementation of FIG. 4B, absorbing solution 433 is a polar solution concentrated into reservoirs 415 since reservoir surface 421 are hydrophilic in the absence of incoming activation light 491. Since the concentration of absorbing solution 433 is pulled into reservoirs 415, optical element 401 is in its minimum absorption state and a majority of the incident light 499 propagates through transparent surrounding fluid 431 of optical element 401. Laplace pressure may also assist in pushing absorbing solution 433 into reservoirs 415.

Returning to the front view of FIG. 4A, light 499 that would propagate through an optical element 401 (that included layers 420 that is similar to example layer 410) would largely propagate through optical element 401 since reservoirs 415 holding absorbing solution 433 occupy a low percentage (e.g. 1%-15%) of the area of layer 410/420. In FIG. 4B, remaining light 498 (the portion of incident light 499 that is not absorbed by absorbing molecules in absorbing solution 433) may have 90% or more the intensity of incident light 499. In other words, optical element 401 may have 90% or more transparency to visible light in its minimum absorption state. In an implementation, a majority of visible light included in incident light 499 is allowed to propagate through optical element 401 in the absence of incoming activation light 491.

FIG. 4C illustrates a front view of layer 410 where reservoir surfaces 421 have changed hydrophobicity in response to incoming activation light 491. In the particular illustrated implementation of FIGS. 4C and 4D, the checked fill pattern of layer 410 indicates that reservoir surfaces 421 have changed from hydrophilic (in FIGS. 4A and 4B) to hydrophobic.

The top view of optical element 401 in FIG. 4D illustrates reservoir surfaces 421 have changed hydrophobicity in response to incoming activation light 491 becoming incident on reservoir surfaces 421. As a result, reservoir surfaces 421 have changed to hydrophobic surfaces and absorbing molecules in the absorbing solution 433 form absorption layer 436 that is substantially parallel to layer 420 and 440 when incoming activation light 491 is incident on reservoir surfaces 421. When reservoir surfaces 421 switch to hydrophobic surfaces, absorbing solution 433 is expelled from reservoirs 415 since the hydrophobic reservoir surfaces 421 repel the polar absorbing solution 433. FIGS. 4C and 4D illustrate the maximum absorption state of optical element 401 where the remaining light 497 (the portion of incident light 499 that is not absorbed by absorbing molecules in absorption layer 436) is less than 50% of the intensity of incident light 499. In some implementations remaining light 497 may be less than 10% of the intensity of incident light 499. Absorption layer 436 may extend as two-dimensional absorption layers that approach the full two-dimensional area of layers 420 and 440 of optical element 401.

Figure 5A:
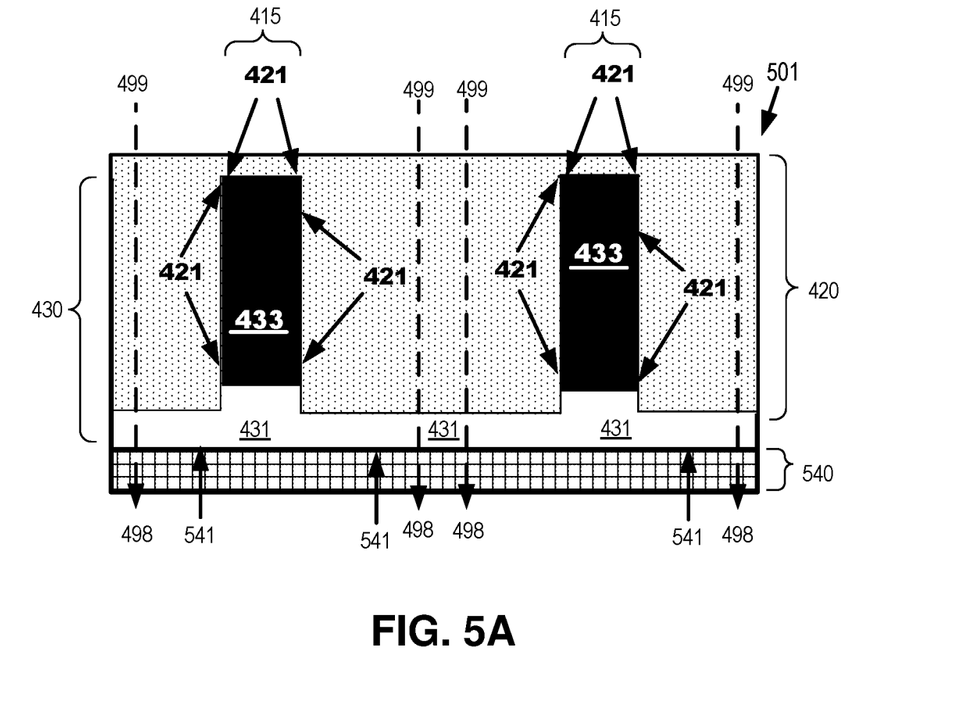
FIG. 5A illustrates a top view of a minimum absorption state of an example photowetting optical element, in accordance with aspects of the disclosure.
Figure 5B:
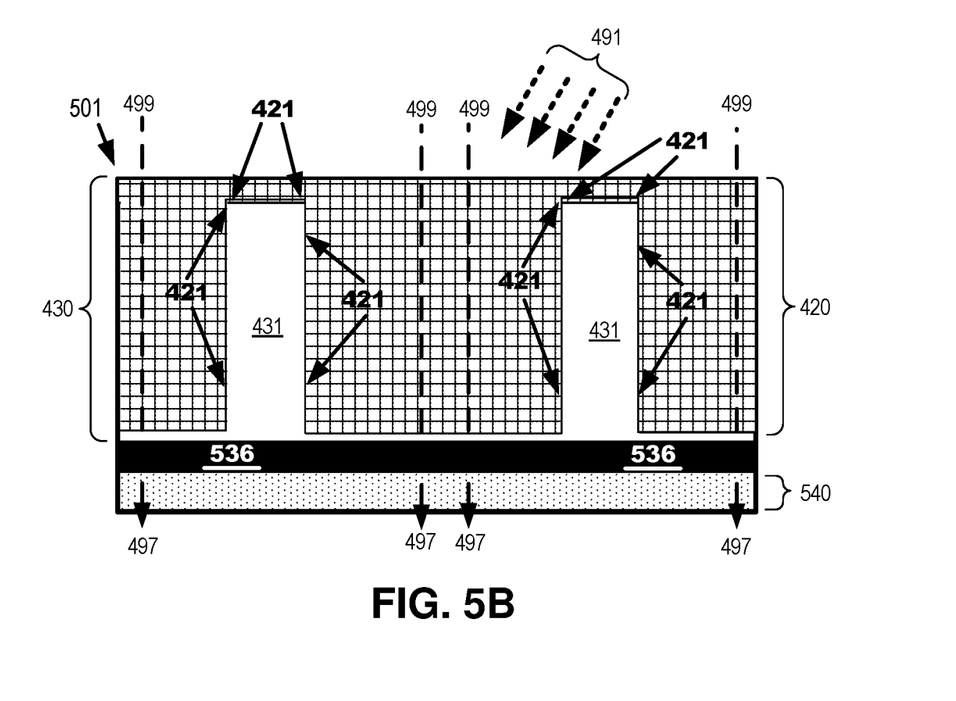
FIG. 5B illustrates a top view of a maximum absorption state of an example photowetting optical element, in accordance with aspects of the disclosure.

FIGS. 5A and 5B illustrate an optical element 501 that includes a second surface 541 of second layer 540 configured to change hydrophobicity in response to incoming activation light 491 becoming incident onto second surface 541, in accordance with aspects of the disclosure. In optical element 401, second layer 440 does not change hydrophobicity in response to incident incoming activation light 491. Optical element 501 is similar to optical element 401 although second surface 541 of optical element 501 is configured to change hydrophobicity in response to incident incoming activation light 491.

FIG. 5A illustrates a top view of a minimum absorption state of optical element 501 and FIG. 5B illustrates a top view of a maximum absorption state of optical element 501. In the particular illustrated example of FIG. 5A, second surface 541 is configured to be hydrophobic in the absence of incoming activation light 491. In FIG. 5B, second surface 541 has changed to be hydrophilic in response to incoming activation light 491 becoming incident on the surface 541. Having surface 541 configured to change hydrophobicity may enhance the concentration of the absorbing molecules in reservoirs 415 in the minimum absorption state and assist in drawing the absorbing molecules into forming absorption layer 536 in the maximum absorption state of FIG. 5B. Absorption layer 536 is substantially parallel to layer 420 and 540 when incoming activation light 491 is incident on reservoir surfaces 421.

Optical elements 401 and 501 may absorb less than ten percent transparent of incident visible light in light 499 when the absorbing solution 433 is concentrated in reservoirs 415 and optical elements 401 and 501 may absorb more than fifty percent of incident visible light in light 499 when the absorbing solution 433 forms the absorption layers 436/536 when the incoming activation light 491 is incident on the reservoir surfaces 421.

It is understood that any of example optical elements 172, 200, 300, 400, or 500 may be fabricated as prescription optical elements or non-prescription optical elements. If the example optical elements are prescription optical elements, one or more of the layers (e.g. 220, 320, 420, 520, 240, 340, 440, or 540) may be fabricated with curvatures that impart optical power.

In other implementations of the disclosure, a fluid may include a transparent polar fluid and a nonpolar solution that includes the absorbing molecules. In that implementation, the absorbing molecules in the nonpolar solution change position or shape in response to a surface changing hydrophobicity in response to incoming activation light.

In some implementations, the fluid includes photoactive molecules that change hydrophobicity and/or color in response to incoming activation light and the surfaces may be either static hydrophobic or static hydrophilic.

In some implementations, a photochromic dye may be included in absorbing solutions 233/333/433 to improve the contrast between minimum absorption states and maximum absorption states of the optical elements. In some implementations, a photochromic dye is used instead of the static absorbing dyes described in absorbing solutions 233/333/433.

Figure 6:
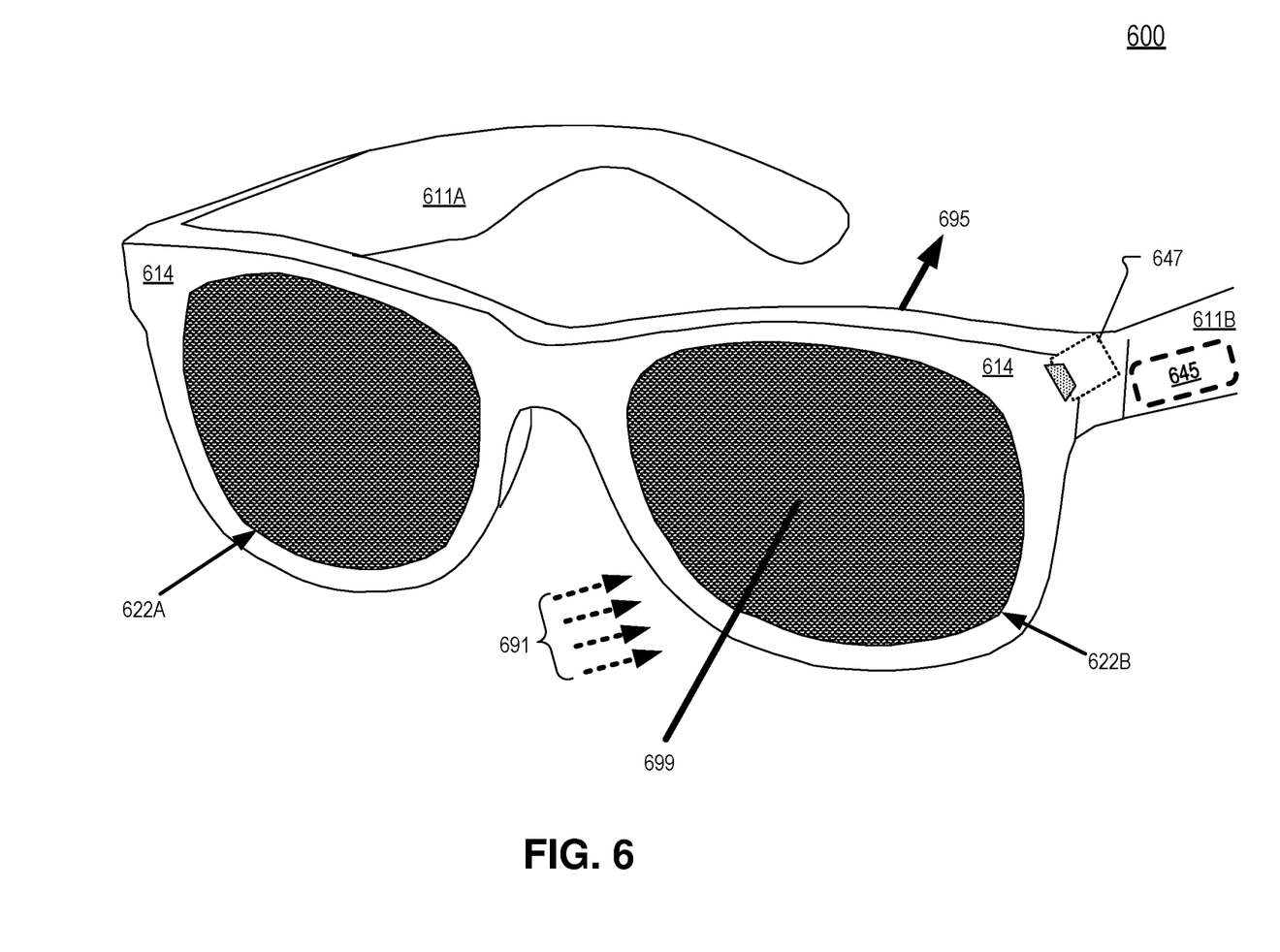
FIG. 6 illustrates a head mounted device that may include photowetting optical elements, in accordance with aspects of the disclosure.

FIG. 6 illustrates a head mounted device 600 that includes optical elements 622A and 622B, in accordance with aspects of the disclosure. Head mounted device 600 may include various electronics such as a camera 647 and/or processing logic 645. Optical elements 622A and 622B may incorporate the features of optical elements 201, 301, 401, or 501. Head mounted device 600 include arms 611A and 611B coupled to a frame 614. Optical elements 622A and 622B are included in frame 614. If optical elements 622B is in a maximum absorption state when incoming activation light 691 is present, the remaining light 695 (the portion of incident light 699 that is not absorbed by absorbing molecules in optical element 622B) will be significantly reduced. If optical element 622B is in a minimum absorption state, the remaining light 695 may have almost the same intensity as incident light 699.

Figure 7:
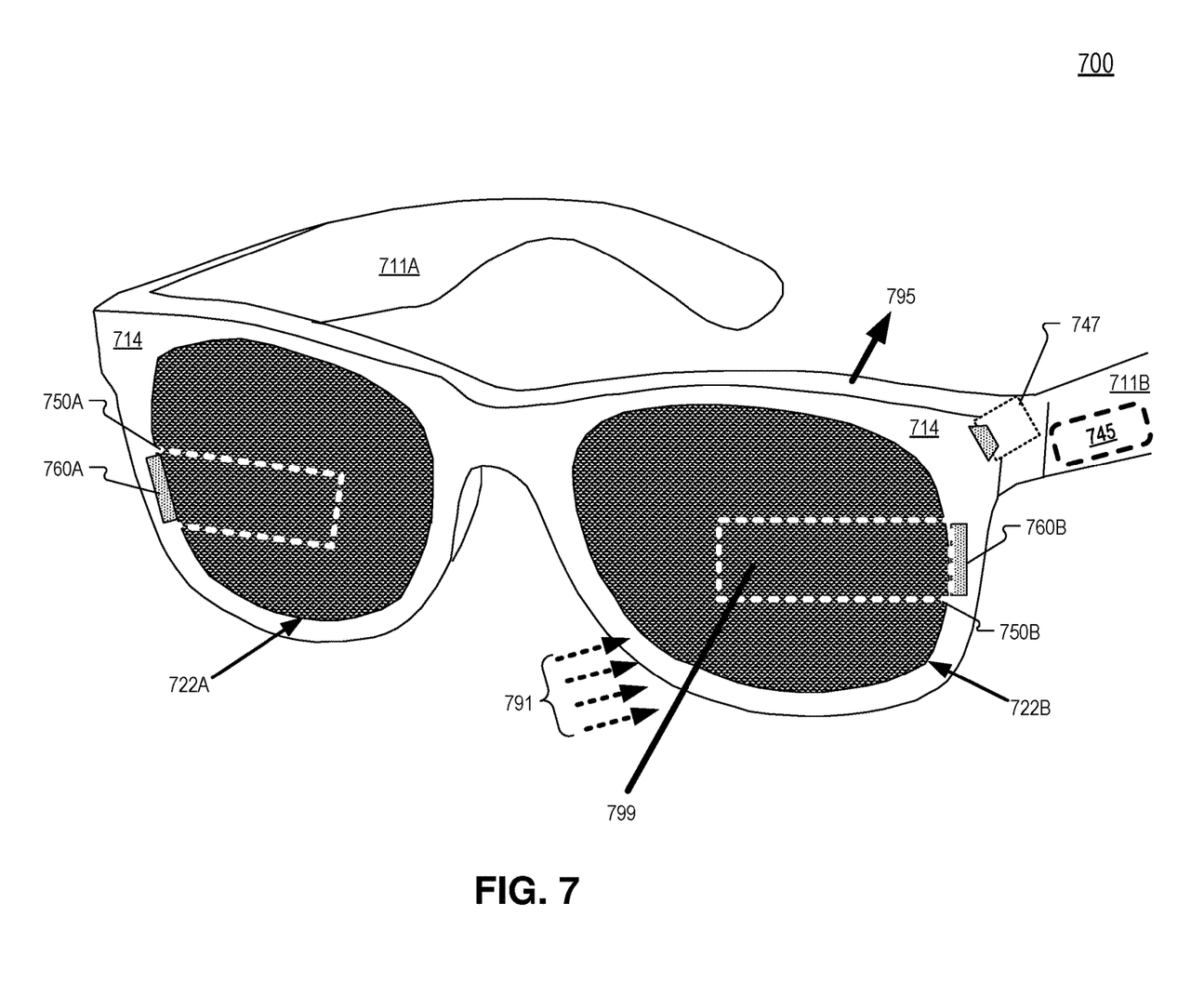
FIG. 7 illustrates a head mounted display (HMD) that may include photowetting optical elements, in accordance with aspects of the disclosure.

FIG. 7 illustrates a head mounted display (HMD) 700 that includes optical elements 722A and 722B, in accordance with aspects of the disclosure. HMD 700 may include various electronics such as a camera 747 and/or processing logic 745. In FIG. 7, optical element 722A includes a waveguide 750A to direct image light generated by display 760A to an eye of a user. Optical element 722B may also include a waveguide 750B to direct image light generated by display 760B to an eye of a user. Therefore, in some embodiments, optical elements include a waveguide 750 to present images to an eye of a wearer of HMD 700. HMD 700 may include alternative display optical elements (not illustrated) to facilitate display architectures that do not necessarily use a waveguide to present images to an eye of a wearer of HMD 700. For example, HMD 700 may utilize a holographic display to present images to an eye of a wearer of HMD 700.

Optical elements 722A and 722B may incorporate the features of optical elements 201, 301, 401, or 501. HMD 700 include arms 711A and 711B coupled to a frame 714. Optical elements 722A and 722B are included in frame 714. If optical elements 722B is in a maximum absorption state when incoming activation light 791 is present, the remaining light 795 (the portion of incident light 799 that is not absorbed by absorbing molecules in optical element 722B) will be significantly reduced. If optical element 722B is in a minimum absorption state, the remaining light 795 may have almost the same intensity as incident light 799.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 645 or 745) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical element comprising:
   a first layer having a first surface configured to change hydrophobicity in response to incoming activation light incident onto the first surface, wherein the incoming activation light is within an activation wavelength band;
   a second layer; and
   a fluid disposed between the first layer and the second layer, wherein the fluid is configured to change shape or position in response to the first surface changing hydrophobicity, wherein the fluid includes absorbing molecules configured to absorb light, wherein the change in hydrophobicity of the first surface is unassisted by electrical charge being applied to the first surface; and
   cell boundaries that confine the fluid to individual cells in a plurality of cells disposed between the first layer and the second layer, wherein the first surface is configured to repel the absorbing molecules so that the absorbing molecules concentrate along the cell boundaries in the absence of incoming activation light incident on the first surface.

2. The optical element of claim 1, wherein the fluid includes a surrounding fluid that is immiscible to an absorbing solution that includes the absorbing molecules, and wherein the surrounding fluid is transparent to visible light.

3. The optical element of claim 2, wherein the surrounding fluid is nonpolar, and wherein the absorbing solution is polar.

4. The optical element of claim 1, wherein the activation wavelength band includes ultraviolet light.

5. The optical element of claim 1, wherein a second surface of the second layer is also configured to change hydrophobicity in response to the incoming activation light also becoming incident on the second surface.

6. The optical element of claim 1, wherein the absorbing molecules form an absorption layer disposed substantially parallel to the first layer when the incoming activation light is incident on the first surface.

7. The optical element of claim 1, wherein the optical element provides optical power.

8. An optical element comprising:
   a first layer including reservoirs having reservoir surfaces configured to be hydrophobic when incoming activation light is incident on the reservoir surfaces, wherein the reservoir surfaces are configured to be hydrophilic in the absence of incoming activation light;
   a second layer; and
   a fluid, wherein the fluid includes a polar absorbing solution configured to concentrate within the reservoirs when the reservoir surfaces are hydrophilic, and wherein the polar absorbing solution is configured to exit the reservoirs to form an absorption layer disposed substantially parallel to the second layer when the reservoir surfaces are hydrophobic when incoming activation light is incident on the reservoir surfaces, wherein a second surface of the second layer is configured to be hydrophilic in response to the incoming activation light becoming incident on the second surface and configured to be hydrophobic in the absence of the incoming activation light incident on the second surface.

9. The optical element of claim 8, wherein the fluid includes a surrounding fluid that is immiscible to the polar absorbing solution, and wherein the surrounding fluid is transparent to visible light.

10. The optical element of claim 8, wherein the incoming activation light includes ultraviolet light.

11. The optical element of claim 8, wherein the absorption layer absorbs visible light.

12. The optical element of claim 8, wherein the optical element absorbs less than ten percent of incident visible light when the polar absorbing solution is concentrated in the reservoirs, and wherein the optical element absorbs more than fifty percent of incident visible light when the polar absorbing solution forms the absorption layer when the incoming activation light is incident on the reservoir surfaces.

13. The optical element of claim 8, wherein the reservoir surfaces include photochromic azobenzene.

14. A head mounted device comprising:
a frame including electronics; and
an optical element mounted in the frame, the optical element comprising:
a first layer having a first surface configured to change hydrophobicity in response to incoming activation light incident onto the first surface, wherein the change in hydrophobicity of the first surface is unassisted by electrical charge being applied to the first surface, and wherein the incoming activation light is within an activation wavelength band;
a second layer; and
a fluid disposed between the first layer and the second layer, wherein the fluid is configured to be repelled or attracted to the first surface changing hydrophobicity, wherein the fluid includes absorbing molecules configured to absorb light.

15. The head mounted device of claim 14, wherein the fluid includes a surrounding fluid that is immiscible to an absorbing solution that includes the absorbing molecules, and wherein the surrounding fluid is transparent to visible light.

16. The head mounted device of claim 14, wherein the first surface is hydrophobic in the absence of the incoming activation light, and wherein the first surface is hydrophilic when the incoming activation light is incident on the first surface, and wherein the first layer includes first pillar surfaces that are hydrophilic in the absence of the incoming activation light, wherein the second layer includes second pillar surfaces that are hydrophilic in the absence of the incoming activation light, wherein the absorbing molecules in an absorbing solution of the fluid are configured to concentrate into absorbing pillars between the hydrophilic first pillar surfaces and the hydrophilic second pillar surfaces in the absence of the incoming activation light.

17. The head mounted device of claim 16, wherein a length of the absorbing pillars runs substantially normal to the first layer and the second layer to allow a majority of visible light to propagate through the optical element in the absence of the incoming activation light, and wherein the absorbing molecules form an absorption layer disposed substantially parallel to the first layer when the incoming activation light is incident on the first surface.

18. The head mounted device of claim 14, wherein the activation wavelength band includes ultraviolet light.

19. The head mounted device of claim 14, wherein a second surface of the second layer is also configured to change hydrophobicity in response to the incoming activation light also becoming incident on the second surface.

* * * * *